(12) United States Patent
Wang et al.

(10) Patent No.: US 9,571,569 B2
(45) Date of Patent: Feb. 14, 2017

(54) METHOD AND APPARATUS FOR DETERMINING VIRTUAL MACHINE MIGRATION

(71) Applicant: Huawei Technologies Co., Ltd., Shenzhen (CN)

(72) Inventors: Yuchen Wang, Beijing (CN); Qiang Yang, Chengdu (CN); Yujia Weng, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 134 days.

(21) Appl. No.: 14/721,619

(22) Filed: May 26, 2015

(65) Prior Publication Data

US 2015/0281347 A1 Oct. 1, 2015

Related U.S. Application Data

(63) Continuation of application No. PCT/CN2012/086524, filed on Dec. 13, 2012.

(51) Int. Cl.
 *H04L 29/08* (2006.01)
 *G06F 9/50* (2006.01)
 (Continued)

(52) U.S. Cl.
 CPC ....... *H04L 67/1021* (2013.01); *G06F 9/45533* (2013.01); *G06F 9/4856* (2013.01);
 (Continued)

(58) Field of Classification Search
 USPC ........ 709/203, 224, 219, 223, 226, 245, 217
 See application file for complete search history.

(56) References Cited

U.S. PATENT DOCUMENTS

| 8,554,900 B2 | 10/2013 | Nelson |
| 2009/0112972 A1* | 4/2009 | Liu ..................... G06F 9/45537 709/203 |

(Continued)

FOREIGN PATENT DOCUMENTS

| CN | 101631110 A | 1/2010 |
| CN | 102821023 A | 12/2012 |

(Continued)

OTHER PUBLICATIONS

Foreign Communication From A Counterpart Application, Chinese Application No. 201280002038.1, Chinese Office Action dated Jan. 6, 2015, 3 pages.

(Continued)

*Primary Examiner* — Jude Jean Gilles
(74) *Attorney, Agent, or Firm* — Conley Rose, P.C.

(57) ABSTRACT

A method for determining virtual machine migration relates to the field of communications and can reduce a deployment cost. The method includes a client in a host machine obtains a unique identifier of a virtual machine on the host machine and an address of the host machine; and if the unique identifier of the virtual machine does not exist in a local record of the client, the client sends a packet to a server in a network in which the host machine is located, where the packet carries the unique identifier of the virtual machine and the address of the host machine, so that the server determines, according to the unique identifier of the virtual machine and the address of the host machine, whether the virtual machine is migrated; and the client adds the unique identifier of the virtual machine to the local record to update the local record.

20 Claims, 8 Drawing Sheets

(51) Int. Cl.
    *G06F 9/455*  (2006.01)
    *G06F 11/34*  (2006.01)
    *G06F 9/48*   (2006.01)
    *G06F 15/16*  (2006.01)

(52) U.S. Cl.
    CPC .......... *G06F 9/5027* (2013.01); *G06F 9/5088* (2013.01); *G06F 11/34* (2013.01); *G06F 2209/508* (2013.01)

(56) References Cited

U.S. PATENT DOCUMENTS

| | | |
|---|---|---|
| 2009/0249438 A1 | 10/2009 | Litvin et al. |
| 2009/0249472 A1* | 10/2009 | Litvin ................. H04L 63/0263 726/14 |
| 2010/0017519 A1 | 1/2010 | Han et al. |
| 2010/0241734 A1* | 9/2010 | Miyajima ............. H04L 63/166 709/219 |
| 2011/0142053 A1* | 6/2011 | Van Der Merwe ..... H04L 47/72 370/395.1 |
| 2011/0231680 A1* | 9/2011 | Padmanabhan ....... G06F 1/3209 713/310 |
| 2011/0238820 A1 | 9/2011 | Matsuoka |
| 2012/0185856 A1 | 7/2012 | Ashihara et al. |
| 2014/0215010 A1 | 7/2014 | Liang et al. |

FOREIGN PATENT DOCUMENTS

| | | |
|---|---|---|
| CN | 102821028 A | 12/2012 |
| JP | 201170549 A | 4/2011 |
| JP | 2011198299 A | 10/2011 |

OTHER PUBLICATIONS

Foreign Communication From A Counterpart Application, Chinese Application No. 201280002038.1, Chinese Search Report dated Dec. 12, 2014, 2 pages.
Foreign Communication From A Counterpart Application, European Application No. 12889778.2, Extended European Search Report dated Apr. 22, 2015, 8 pages.
Foreign Communication From A Counterpart Application, PCT Application No. PCT/CN2012/086524, International Search Report dated Jul. 18, 2013, 6 pages.
Foreign Communication From A Counterpart Application, PCT Application No. PCT/CN2012/086524, Written Opinion dated Jul. 18, 2013, 4 pages.
Partial English Translation and Abstract of Japanese Patent Application No. JPA201170549, Jul. 22, 2016, 68 pages.
Partial English Translation and Abstract of Japanese Patent Application No. JPA2011198299, Jul. 22, 2016, 89 pages.
Foreign Communication From a Counterpart Application, Japanese Application No. 2015-528834, Japanese Office Action dated May 31, 2016, 2 pages.
Foreign Communication From a Counterpart Application, Japanese Application No. 2015-528834, English Translation of Japanese Office Action dated May 31, 2016, 2 pages.

* cited by examiner

METHOD AND APPARATUS FOR DETERMINING VIRTUAL MACHINE MIGRATION

CROSS-REFERENCE TO RELATED APPLICATIONS

This application is a continuation of International Application No. PCT/CN2012/086524 filed on Dec. 13, 2012, which is hereby incorporated by reference in its entirety.

TECHNICAL FIELD

The present invention relates to the field of communications, and in particular, to a method and an apparatus for determining virtual machine migration.

BACKGROUND

At present, a virtual machine technology is commonly applied to various cloud computing environments, and a core idea of cloud computing is to uniformly manage and schedule a great number of resources (the resources herein include a storage resource, a computing resource, and various types of application software) connected using a network, to form a resource pool to provide a user with a service on demand. In the virtual machine technology, one or more virtual machines can be virtualized on one physical host, so that several or even dozens of virtual machines can share a hardware resource of one physical host, thereby improving utilization of the resource. However, the application of the virtual machine technology also brings new challenges to network security management. An existing physical security device protects security of a domain formed by physical hosts, for example, security of an internal local area network of a company, but cannot monitor traffic between virtual machines in a virtualized network formed by several virtual machines, especially virtual machines on a same host machine (in this specification, a physical host that provides a hardware resource for a virtual machine is referred to as a host machine). In addition, virtual machine migration also makes a static security policy no longer applicable, where the virtual machine migration refers to a phenomenon that a virtual machine originally implemented based on a hardware resource and a processing resource of one physical host is implemented by a hardware resource and a processing resource of another physical host.

In the prior art, whether traffic of a virtual machine in a virtualized network is monitored by a physical security device or by a secure virtual machine on a host machine, it requires that a security policy be dynamically adjusted when virtual machine migration occurs. Therefore, how to determine that virtual machine migration occurs becomes a key problem.

A current manner of determining virtual machine migration is that traffic of a virtual machine is completely imported into a switch, and the switch determines existence of the virtual machine. However, this manner requires a tailor-made switch that supports a protocol, for example, a switch that supports the Virtual Ethernet Port Aggregator (VEPA) protocol, and a virtual machine vendor also needs to provide support. Therefore, a deployment cost is high.

SUMMARY

Embodiments of the present invention provide a method and an apparatus for determining virtual machine migration, which can reduce a deployment cost.

According to a first aspect, a method for determining virtual machine migration is provided, where the method includes obtaining, by a client in a host machine, a unique identifier of a virtual machine on the host machine and an address of the host machine; and if the unique identifier of the virtual machine does not exist in a local record of the client, sending, by the client, a packet to a server in a network in which the host machine is located, where the packet carries the unique identifier of the virtual machine and the address of the host machine, so that the server determines, according to the unique identifier of the virtual machine and the address of the host machine, whether the virtual machine is migrated; and adding, by the client, the unique identifier of the virtual machine to the local record to update the local record.

In a first possible implementation manner of the first aspect, the obtaining, by a client in a host machine, a unique identifier of a virtual machine on the host machine includes intercepting, by the client in the host machine, a packet from the virtual machine on the host machine, where the packet carries the unique identifier of the virtual machine; and obtaining the unique identifier of the virtual machine from the intercepted packet.

In a second possible implementation manner of the first aspect, the obtaining, by a client in a host machine, a unique identifier of a virtual machine on the host machine includes receiving, by the client in the host machine, a packet from the virtual machine on the host machine and forwarded by a virtual switch on the host machine, where the packet carries the unique identifier of the virtual machine on the host machine; and obtaining the unique identifier of the virtual machine from the received packet.

With reference to the first or second possible implementation manner of the first aspect, in a third possible implementation manner of the first aspect, the packet from the virtual machine on the host machine is an Address Resolution Protocol (ARP) packet.

With reference to the first aspect, or the first, second, or third possible implementation manner of the first aspect, in a fourth possible implementation manner of the first aspect, before the adding, by the client, the unique identifier of the virtual machine to the local record, the method further includes receiving, by the client, a response packet that indicates successful reception and is sent by the server; and when the response packet that indicates successful reception and is sent by the server is received, adding, by the client, the unique identifier of the virtual machine to the local record.

With reference to the first aspect, or the first, second, or third possible implementation manner of the first aspect, in a fifth possible implementation manner of the first aspect, the unique identifier is a media access control (MAC) address of the virtual machine, or a statically configured internet protocol (IP) address of the virtual machine.

With reference to the first aspect, or the first, second, or third possible implementation manner of the first aspect, in a sixth possible implementation manner of the first aspect, the client is disposed in a secure virtual machine in the host machine, the virtual switch in the host machine, or a component in the host machine and connected to a physical network adapter.

According to a second aspect, a method for determining virtual machine migration is provided, where the method includes receiving, by a server, a packet sent by a client in a host machine, where the packet carries a unique identifier of a virtual machine on the host machine and an address of the host machine in which the client is located; if the unique identifier of the virtual machine does not exist in a local record of the server, adding, by the server, a correspondence between the unique identifier of the virtual machine and the address of the host machine to the local record of the server; and if the unique identifier of the virtual machine exists in the local record of the server, determining, by the server, whether the address of the host machine carried in the packet is the same as a host machine address corresponding to the unique identifier of the virtual machine in the local record of the server; if the address of the host machine carried in the packet is the same as the host machine address corresponding to the unique identifier of the virtual machine, determining that the virtual machine is not migrated; and if the address of the host machine carried in the packet is different from the host machine address corresponding to the unique identifier of the virtual machine, determining that the virtual machine is migrated.

In a first possible implementation manner of the second aspect, after the receiving a packet sent by a client, the method further includes sending, to the client, a response packet indicating successful reception, so that the client adds the unique identifier of the virtual machine to a local record of the client.

With reference to the second aspect or the first possible implementation manner of the second aspect, in a second possible implementation manner of the second aspect, if the address of the host machine carried in the packet is different from the host machine address corresponding to the unique identifier of the virtual machine in the local record of the server, the method further includes updating the host machine address that is corresponding to the unique identifier of the virtual machine and has been stored in the local record of the server to be the address of the host machine carried in the packet.

According to a third aspect, an apparatus for determining virtual machine migration is provided, where the apparatus includes a processing unit, configured to obtain a unique identifier of a virtual machine on a host machine in which the apparatus is located and an address of the host machine; a sending unit, configured to, if the processing unit determines that the unique identifier of the virtual machine does not exist in a local record of the apparatus, send a packet to a server in a network in which the host machine is located, where the packet carries the unique identifier of the virtual machine and the address of the host machine, so that the server determines, according to the unique identifier of the virtual machine and the address of the host machine, whether the virtual machine is migrated; and a storing unit, configured to, if the processing unit determines that the unique identifier of the virtual machine does not exist in the local record, add the unique identifier of the virtual machine to the local record to update the local record.

In a first possible implementation manner of the third aspect, the processing unit is configured to intercept a packet from the virtual machine on the host machine, where the packet carries the unique identifier of the virtual machine; and obtain the unique identifier of the virtual machine from the intercepted packet.

In a second possible implementation manner of the third aspect, the processing unit is configured to receive a packet from the virtual machine on the host machine and forwarded by a virtual switch on the host machine, where the packet carries the unique identifier of the virtual machine on the host machine; and obtain the unique identifier of the virtual machine on the host machine from the received packet.

With reference to the first or second possible implementation manner of the third aspect, in a third possible implementation manner, the packet from the virtual machine on the host machine is an ARP packet.

With reference to the first, second, or third possible implementation manner of the third aspect, in a fourth possible implementation manner, the apparatus further includes a receiving unit, configured to, before the storing unit adds the unique identifier of the virtual machine to the local record, receive a response packet that indicates successful reception and is sent by the server; the storing unit is configured to, when the receiving unit receives the response packet that indicates successful reception and is sent by the server, add the unique identifier of the virtual machine to the local record.

With reference to the third aspect, or the first, second, or third possible implementation manner of the third aspect, in a fifth possible implementation manner, the apparatus is disposed in a secure virtual machine in the host machine, the virtual switch in the host machine, or a component in the host machine and connected to a physical network adapter.

According to a fourth aspect, an apparatus for determining virtual machine migration is provided, where the apparatus includes a receiving unit, configured to receive a packet sent by a client in a host machine, where the packet carries a unique identifier of a virtual machine on the host machine and an address of the host machine in which the client is located; a determining unit, configured to determine whether the unique identifier of the virtual machine exists in a local record of the apparatus; and a storing unit, configured to, if the determining unit determines that the unique identifier of the virtual machine does not exist in the local record of the apparatus, add a correspondence between the unique identifier of the virtual machine and the address of the host machine to the local record of the apparatus; the determining unit is further configured to, if the unique identifier of the virtual machine exists in the local record of the apparatus, determine whether the address of the host machine carried in the packet is the same as a host machine address corresponding to the unique identifier of the virtual machine in the local record of the apparatus; if the address of the host machine carried in the packet is the same as the host machine address corresponding to the unique identifier of the virtual machine in the local record of the apparatus, determine that the virtual machine is not migrated; and if the address of the host machine carried in the packet is different from the host machine address corresponding to the unique identifier of the virtual machine in the local record of the apparatus, determine that the virtual machine is migrated.

In a first possible implementation manner of the fourth aspect, the apparatus further includes a sending unit, configured to, after the receiving unit receives the packet sent by the client, send, to the client, a response packet indicating successful reception, so that the client adds the unique identifier of the virtual machine to a local record of the client.

With reference to the fourth aspect or the first possible implementation manner of the fourth aspect, in a second possible implementation manner of the fourth aspect, the apparatus further includes an updating unit, configured to, if the address of the host machine carried in the packet is different from the host machine address corresponding to the unique identifier of the virtual machine in the local record of the apparatus, update the host machine address that is corresponding to the unique identifier of the virtual machine and has been stored in the local record of the apparatus to be the address of the host machine carried in the packet.

According to a fifth aspect, a client device is provided, where the device includes a processor, a communications interface, a memory, and a bus, where the processor, the communications interface, and the memory complete mutual communication using the bus; the communications interface is configured to communicate with an external network element; the memory is configured to store a program; and the processor is configured to read the program in the memory, and perform the following operations: obtaining a unique identifier of a virtual machine on a host machine in which the client device is located and an address of the host machine; if the unique identifier of the virtual machine does not exist in a local record, sending a packet to a server in a network in which the host machine is located, where the packet carries the unique identifier of the virtual machine and the address of the host machine, so that the server determines, according to the unique identifier of the virtual machine and the address of the host machine, whether the virtual machine is migrated; and adding the unique identifier of the virtual machine to the local record to update the local record.

In a first possible implementation manner of the fifth aspect, the processor is configured to perform the following operations: intercepting a packet from the virtual machine on the host machine, where the packet carries the unique identifier of the virtual machine on the host machine; and obtaining the unique identifier of the virtual machine on the host machine from the intercepted packet.

In a second possible implementation manner of the fifth aspect, the processor is configured to perform the following operations: receiving a packet from the virtual machine on the host machine and forwarded by a virtual switch on the host machine, where the packet carries the unique identifier of the virtual machine on the host machine; and obtaining the unique identifier of the virtual machine on the host machine from the received packet.

With reference to the first or second possible implementation manner of the fifth aspect, in a third possible implementation manner, the processor is further configured to perform the following operations: receiving a response packet that indicates successful reception and is sent by the server; and when the response packet that indicates successful reception and is sent by the server is received, adding the unique identifier of the virtual machine to the local record.

With reference to the first, second, or third possible implementation manner of the fifth aspect, in a fourth possible implementation manner, the device is disposed in a secure virtual machine in the host machine, the virtual switch in the host machine, or a component in the host machine and connected to a physical network adapter.

According to a sixth aspect, a server device is provided, where the device includes a processor, a communications interface, a memory, and a bus, where the processor, the communications interface, and the memory complete mutual communication using the bus; the communications interface is configured to communicate with an external network element; the memory is configured to store a program; and the processor is configured to read the program in the memory, and perform the following operations: receiving a packet sent by a client in a host machine, where the packet carries a unique identifier of a virtual machine and an address of the host machine in which the client is located; if the unique identifier of the virtual machine does not exist in a local record of the server device, adding a correspondence between the unique identifier of the virtual machine and the address of the host machine to the local record of the server device; and if the unique identifier of the virtual machine exists in the local record of the server device, determining whether the address of the host machine carried in the packet is the same as a host machine address corresponding to the unique identifier of the virtual machine in the local record of the server device; if the address of the host machine carried in the packet is the same as the host machine address corresponding to the unique identifier of the virtual machine in the local record of the server device, determining that the virtual machine is not migrated; and if the address of the host machine carried in the packet is different from the host machine address corresponding to the unique identifier of the virtual machine in the local record of the server device, determining that the virtual machine is migrated.

In a first possible implementation manner of the sixth aspect, the processor is further configured to perform the following operations: after the packet sent by the client is received, sending, to the client, a response packet indicating successful reception, so that the client adds the unique identifier of the virtual machine to a local record of the client.

With reference to the first possible implementation manner of the sixth aspect, in a second possible implementation manner of the sixth aspect, the processor is further configured to perform the following operations: if the address of the host machine carried in the packet is different from the host machine address corresponding to the unique identifier of the virtual machine in the local record of the server device, updating the host machine address that is corresponding to the unique identifier of the virtual machine and has been stored in the local record of the server device to be the address of the host machine carried in the packet.

According to a seventh aspect, a system for determining virtual machine migration is provided, including at least one client device according to the fifth aspect or any one of the possible implementation manners of the fifth aspect, and at least one server device according to the sixth aspect or any one of the possible implementation manners of the sixth aspect.

After the foregoing technical solutions are used, in the method and the apparatus for determining virtual machine migration that are provided by the embodiments of the present invention, a client obtains a unique identifier of a virtual machine on a host machine and an address of the host machine; if the unique identifier of the virtual machine does not exist in a local record of the client, the client sends a packet carrying the unique identifier of the virtual machine and the address of the host machine to a server; after the server receives the packet, if the unique identifier of the virtual machine exists in a local record of the server, the server determines whether the address of the host machine carried in the packet is the same as a host machine address corresponding to the unique identifier of the virtual machine in the local record; if the address of the host machine carried in the packet is the same as the host machine address corresponding to the unique identifier of the virtual machine in the local record, the server determines that the virtual machine is not migrated; and if the address of the host machine carried in the packet is different from the host machine address corresponding to the unique identifier of the virtual machine in the local record, the server determines that the virtual machine is migrated. In this way, virtual machine migration is determined without using a specific communications protocol (for example, the VEPA protocol) involved in the virtual machine migration, and a communications device that supports the specific communications protocol is not needed. Therefore, a requirement on a communications device is lowered, thereby reducing a deployment cost.

BRIEF DESCRIPTION OF DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
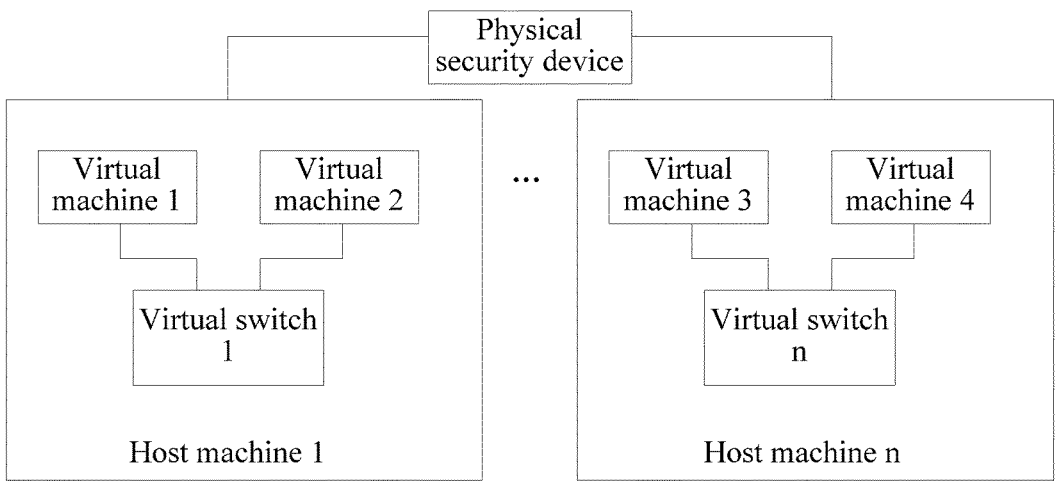
FIG. 1 is a schematic diagram of a deployment structure of a system to which a method for determining virtual machine migration according to an embodiment of the present invention is applied.

FIG. 1 is a schematic diagram of a deployment structure of a system to which a method for determining virtual machine migration according to an embodiment of the present invention is applied. To make the present invention more comprehensible, the following first briefly describes the deployment structure with reference to FIG. 1.

The deployment structure may include multiple host machines, and in FIG. 1, descriptions are provided merely using an example that the deployment structure includes two host machines: a host machine 1 and a host machine n. The host machine 1 may be connected to the host machine n using a physical security device (for example, a switch). A virtual machine and a virtual switch are disposed in the host machine 1 and the host machine n each. The host machine 1 may include a virtual switch 1 and multiple virtual machines (two in the figure: a virtual machine 1 and a virtual machine 2), where the virtual machine 1 and the virtual machine 2 are separately in communication connection with the virtual switch 1. The host machine n may include a virtual switch n and multiple virtual machines (two in the figure: a virtual machine 3 and a virtual machine 4), where the virtual machine 3 and the virtual machine 4 are separately in communication connection with the virtual switch n.

When a virtual machine performs communication, a packet sent by the virtual machine first reaches a virtual switch on a host machine on which the virtual machine is located, and may be transmitted by the virtual switch to another virtual machine that is in communication connection with the virtual switch, or transmitted by the virtual switch to a physical network adapter of the host machine, and may be further transmitted by the physical network adapter to another device except the host machine.

In addition, a secure virtual machine (not shown in FIG. 1) may be further disposed in the host machine as required. In this embodiment of the present invention, the secure virtual machine is a virtual machine device that provides security protection for network traffic and is in the host machine. The secure virtual machine may be in communication connection with a virtual switch, and when the virtual switch imports traffic into the secure virtual machine, the secure virtual machine may perform security control on the imported traffic.

In the method for determining virtual machine migration provided by this embodiment of the present invention, based on the structure shown in FIG. 1, a client and a server are introduced, which can determine, with a low deployment cost, whether a virtual machine is migrated.

Figure 2A:
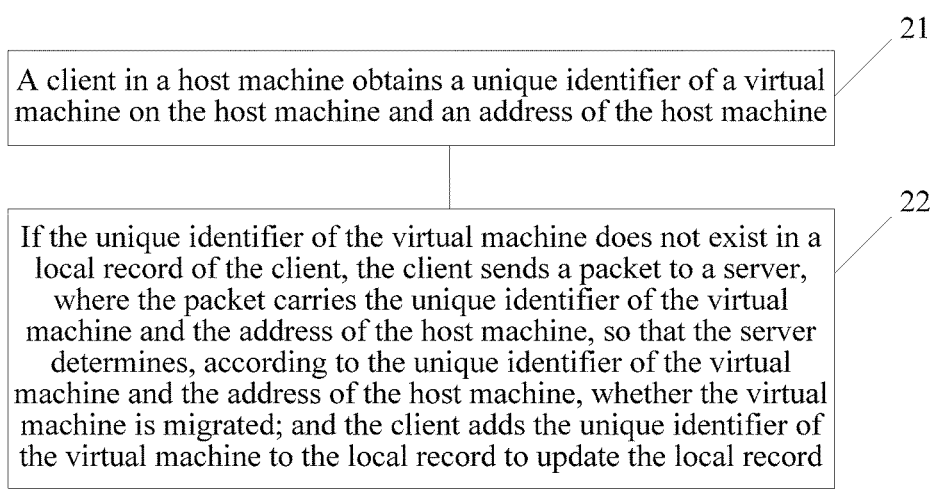
FIG. 2A is a flowchart of a method for determining virtual machine migration according to an embodiment of the present invention.

FIG. 2A is a flowchart of a method for determining virtual machine migration according to an embodiment of the present invention. Referring to FIG. 2A, this embodiment of the present invention provides a method for determining virtual machine migration, where the method is described based on a client in a host machine, and includes the following steps:

21: A client in a host machine obtains a unique identifier of a virtual machine on the host machine and an address of the host machine.

The unique identifier of the virtual machine on the host machine may be a MAC address of the virtual machine, and may also be a static IP address configured by a user, which is not limited herein.

In this embodiment of the present invention, the client in the host machine may be disposed at different locations according to actual needs. For example, referring to FIG. 2B, the client may be disposed in a secure virtual machine in the host machine, referring to FIG. 2C, the client may be disposed in a virtual switch in the host machine, and referring to FIG. 2D, the client may be disposed in a component in the host machine and connected to a physical network adapter, where the component connected to the physical network adapter may be not limited to a physical component, and may also be a component implemented in a software form. Certainly, the client may be disposed at another location, which is not limited in the present invention. According to different locations of the client in the host machine, in this embodiment of the present invention, the unique identifier of the virtual machine on the host machine may be obtained in different manners.

A manner of obtaining the unique identifier of the virtual machine on the host machine may include intercepting, by the client in the host machine, a packet sent by the virtual machine on the host machine, where the packet carries the unique identifier of the virtual machine on the host machine; and obtaining the unique identifier of the virtual machine on the host machine from the intercepted packet. In other words, in this manner, the client may know the unique identifier of the virtual machine by directly intercepting the packet that is sent by the virtual machine on the host machine and carries the unique identifier of the virtual machine. This manner is applicable to a case in which the client is disposed in the virtual switch in the host machine. The packet sent by the virtual machine on the host machine is an ARP packet.

Another manner of obtaining the unique identifier of the virtual machine on the host machine may include receiving, by the client in the host machine, a packet forwarded by the virtual switch on the host machine, where the packet carries the unique identifier of the virtual machine on the host machine; and obtaining the unique identifier of the virtual machine on the host machine from the received packet, where the packet sent by the virtual switch is obtained by the virtual switch by intercepting the packet that is sent by the virtual machine on the host machine. In other words, in this manner, the client knows the unique identifier of the virtual machine by receiving the packet that is forwarded by the virtual switch on the host machine and carries the unique identifier of the virtual machine on the host machine. Before formal communication is started, the virtual machine on the host machine may broadcast the packet carrying the unique identifier of the virtual machine; after intercepting the packet, the virtual switch on the host machine may forward the packet; and the client on the host machine can obtain the unique identifier of the virtual machine on the host machine by receiving the packet forwarded by the virtual switch. This manner is applicable to a case in which the client is disposed in a component in the secure virtual machine and connected to the physical network adapter. The packet sent by the virtual machine may be an ARP packet.

Optionally, in an embodiment of the present invention, the packet sent by the virtual machine on the host machine is an ARP packet, which carries the unique identifier of the virtual machine. Because ARP communication is a necessary process before normal communication and involves a small amount of data, based on an objective of optimizing system performance, the client or the virtual switch may only obtain the ARP packet sent by the virtual machine, and obtain the unique identifier of the virtual machine using the ARP packet.

In this embodiment of the present invention, the host machine refers to a physical machine on which the virtual machine currently resides, and one or more virtual machines may reside on one host machine, which is not limited in the present invention.

In this embodiment of the present invention, the address of the host machine may be an IP address of the host machine, and certainly, may also be an address that can uniquely identify the host machine, for example, a MAC address of the host machine.

In this embodiment of the present invention, a user pre-configures the host machine, and configured content includes the address of the host machine. Therefore, in step 21, the obtaining, by a client in a host machine, an address of the host machine may be obtaining, by the client in the host machine, the address of the host machine according to configuration information input by the user.

After obtaining the unique identifier of the virtual machine on the host machine and the address of the host machine in step 21, the client may determine whether the unique identifier of the virtual machine exists in a local record. The local record may be stored in a cache or a memory, and because a read/write rate of the cache is high, storing the local record in a cache manner can save searching time. After obtaining the unique identifier of the virtual machine on the host machine and the address of the host machine, the client may create a local record used for storing the unique identifier of the virtual machine, and then, may search the local record using the unique identifier (such as the MAC address) of the virtual machine as a searching object; if the unique identifier can be found, determine that the unique identifier of the virtual machine exists in the local record; and if the unique identifier cannot be found, determine that the unique identifier of the virtual machine does not exist in the local record.

Certainly, in the scope of the present invention, another executor in the host machine may determine whether the unique identifier of the virtual machine exists in the local record, and further notify the client of a result indicating whether the unique identifier of the virtual machine exists in the local record.

22: If the unique identifier of the virtual machine does not exist in the local record of the client, the client sends a packet to a server, where the packet carries the unique identifier of the virtual machine and the address of the host machine, so that the server determines, according to the unique identifier of the virtual machine and the address of the host machine, whether the virtual machine is migrated; and the client adds the unique identifier of the virtual machine to the local record to update the local record.

Optionally, the server is disposed in one device in a network in which the host machine is located, and is in communication connection with the client in the host machine. For example, the server may be disposed in the physical security device in FIG. 1, or may be independently disposed in a dedicated device.

Optionally, in an embodiment of the present invention, before the adding, by the client, the unique identifier of the virtual machine to the local record in step 22, the method for determining virtual machine migration provided by this embodiment of the present invention may further include receiving, by the client, a response packet that indicates successful reception and is sent by the server; in this case, the adding, by the client, the unique identifier of the virtual machine to the local record in step 22 may be adding, by the client, the unique identifier of the virtual machine to the local record when receiving the response packet that indicates successful reception and is sent by the server.

According to the method for determining virtual machine migration provided by this embodiment of the present invention, a client in a host machine obtains a unique identifier of a virtual machine and an address of the host machine, and sends the unique identifier of the virtual machine and the address of the host machine to a server, so that if the unique identifier of the virtual machine exists in a local record of the server, the server can determine, by determining whether the address of the host machine carried in a packet sent by the client is the same as a host machine address corresponding to the unique identifier of the virtual machine in the local record, whether the virtual machine is migrated. In this way, virtual machine migration is determined without using a specific communications protocol (for example, the VEPA protocol) involved in the virtual machine migration, and a communications device that supports the specific communications protocol is not needed. Therefore, a requirement on a communications device is lowered to a great extent, thereby reducing a deployment cost.

Figure 3:
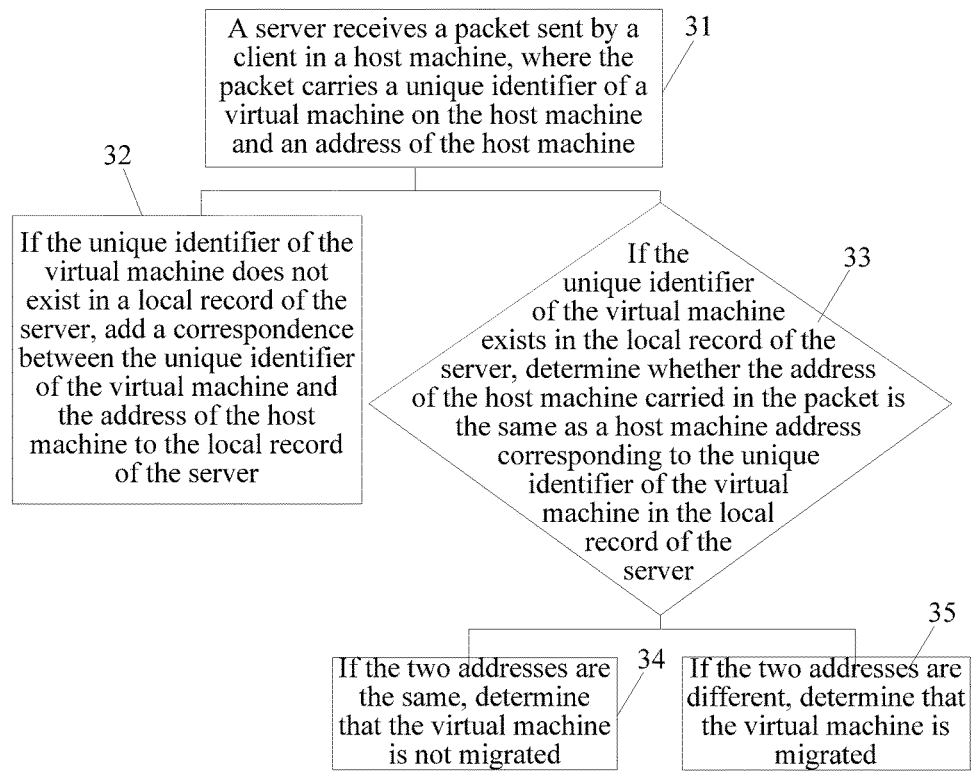
FIG. 3 is a flowchart of a method for determining virtual machine migration according to an embodiment of the present invention.

FIG. 3 is a flowchart of a method for determining virtual machine migration according to an embodiment of the present invention. Referring to FIG. 3, this embodiment of the present invention provides a method for determining virtual machine migration, where the method is described based on a server, and the server may be disposed in a device in a network in which a host machine is located, and is in communication connection with a client in the host machine. For example, the server may be disposed in the physical security device in FIG. 1, or may be independently disposed in a dedicated device. The method includes the following steps.

31: Receive a packet sent by a client in a host machine, where the packet carries a unique identifier of a virtual machine and an address of the host machine.

After the receiving a packet sent by a client in step 31, the method for determining virtual machine migration provided by this embodiment of the present invention may further include sending, to the client, a response packet indicating successful reception, so that the client adds the unique identifier of the virtual machine to a local record.

Before step 32, a server may first determine whether the unique identifier of the virtual machine exists in a local record of the server. The server may search the local record using the unique identifier of the virtual machine as a searching object; if the unique identifier can be found, determine that the unique identifier of the virtual machine exists in the local record; and if the unique identifier cannot be found, determine that the unique identifier of the virtual machine does not exist in the local record.

32: If the unique identifier of the virtual machine does not exist in the local record of the server, add a correspondence between the unique identifier of the virtual machine and the address of the host machine to the local record.

If the unique identifier of the virtual machine does not exist in the local record of the server, that is, in a case in which the correspondence between the unique identifier of the virtual machine and the address of the host machine is added for the first time, it is considered that the virtual machine is not migrated.

33: If the unique identifier of the virtual machine exists in the local record of the server, determine whether the address of the host machine carried in the packet is the same as a host machine address corresponding to the unique identifier of the virtual machine in the local record of the server; if the address of the host machine carried in the packet is the same as the host machine address corresponding to the unique identifier of the virtual machine in the local record of the server, perform step 34; and if the address of the host machine carried in the packet is different from the host machine address corresponding to the unique identifier of the virtual machine in the local record of the server, perform step 35.

34: If the address of the host machine carried in the packet is the same as the host machine address corresponding to the unique identifier of the virtual machine in the local record of the server, determine that the virtual machine is not migrated.

35: If the address of the host machine carried in the packet is different from the host machine address corresponding to the unique identifier of the virtual machine in the local record of the server, determine that the virtual machine is migrated. Further, the host machine address that is corresponding to the unique identifier of the virtual machine and has been stored in the local record of the server may be further updated to be the address of the host machine carried in the packet.

According to the method for determining virtual machine migration provided by this embodiment of the present invention, a client in a host machine obtains a unique identifier of a virtual machine and an address of the host machine, and sends the unique identifier of the virtual machine and the address of the host machine to a server, so that if the unique identifier of the virtual machine exists in a local record of the server, the server can determine, by determining whether the address of the host machine carried in a packet sent by the client is the same as a host machine address corresponding to the unique identifier of the virtual machine in the local record, whether the virtual machine is migrated. In this way, virtual machine migration is determined without using a specific communications protocol involved in the virtual machine migration, and a communications device that supports the specific communications protocol is not needed. Therefore, a requirement on a communications device is lowered to a great extent, thereby reducing a deployment cost.

To make the present invention more comprehensible, the following further describes the present invention using specific embodiments as examples. It should also be noted that, the embodiments listed below are merely some of the embodiments of the present invention, and a person skilled in the art can easily figure out other embodiments from the content of the present invention, and they all fall within the scope of the present invention.

Figure 4:
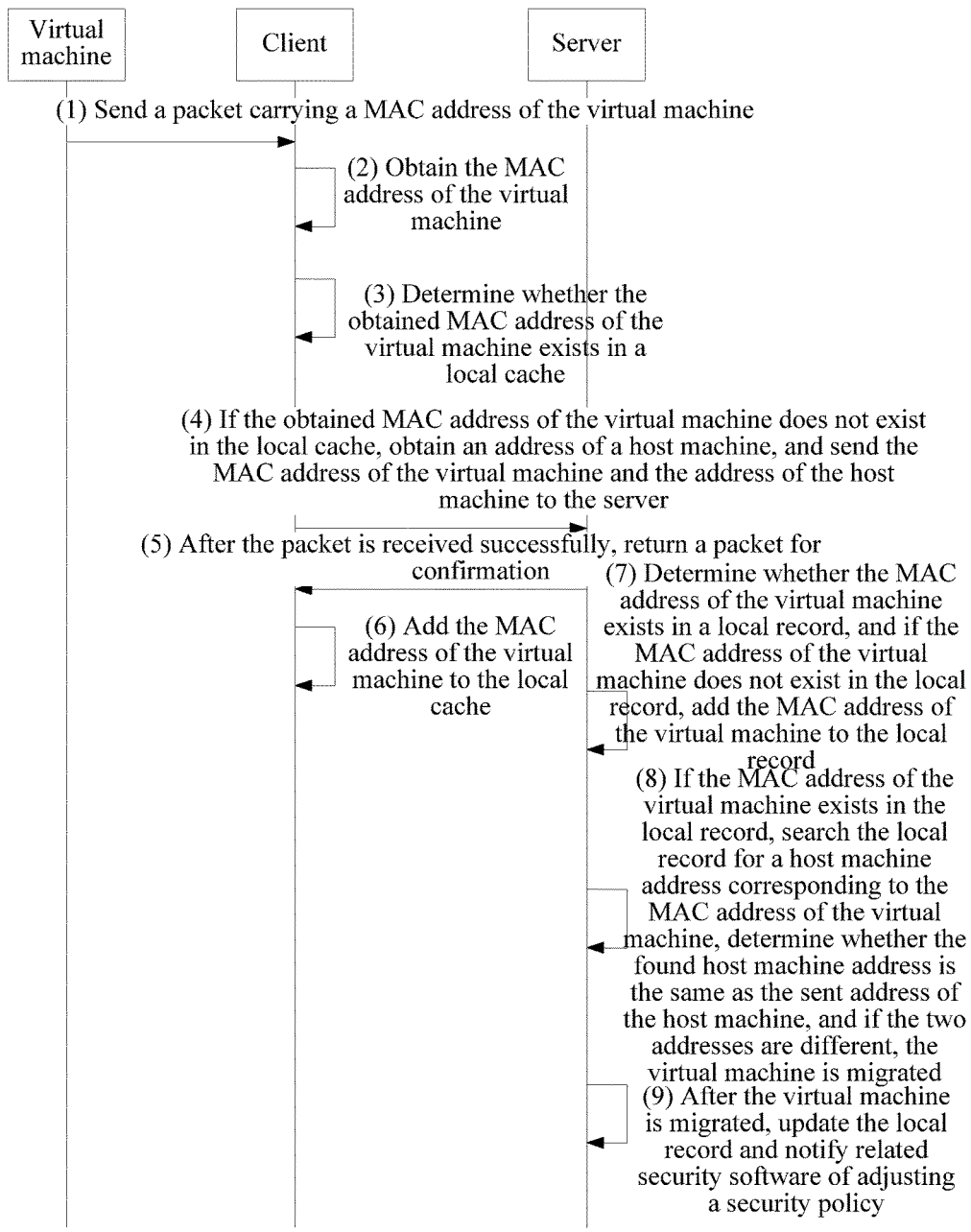
FIG. 4 is a schematic diagram of another method for determining virtual machine migration according to an embodiment of the present invention.

An embodiment provides a method for determining virtual machine migration, which can lower a requirement on a communications device to a great extent, thereby reducing a deployment cost. Referring to FIG. 4, that a unique identifier of a virtual machine is a MAC address is used as an example, and the method may include the following steps.

(1) A virtual machine sends a packet carrying a MAC address of the virtual machine. The packet sent by the virtual machine may be an ARP packet.

(2) A client obtains the MAC address of the virtual machine on a host machine in which the client is located, and creates a local record used for storing MAC addresses of virtual machines.

If the client is disposed in a virtual switch on the host machine, the client may obtain the MAC address of the virtual machine on the host machine by directly intercepting a packet sent by the virtual machine on the host machine and parsing the packet to obtain a source MAC address in the packet, that is, the MAC address of the virtual machine on the host machine; and if the client is disposed in a secure virtual machine or a component connected to a physical network adapter, the client may obtain the MAC address of the virtual machine on the host machine by receiving a packet forwarded by a virtual switch and parsing the packet to obtain a source MAC address, that is, the MAC address of the virtual machine on the host machine.

(3) The client compares the obtained MAC address of the virtual machine and a MAC address in the local record of the client, to determine whether the obtained MAC address of the virtual machine exists in the local record of the client; if the obtained MAC address of the virtual machine exists in the local record of the client, the client terminates the operation; and if the obtained MAC address of the virtual machine does not exist in the local record of the client, the client performs the following step (4).

(4) The client obtains an address (for example, an IP address) of the host machine, and sends the obtained MAC address of the virtual machine and the obtained address of the host machine to a server using a packet.

(5) After receiving the packet carrying the MAC address of the virtual machine and the address of the host machine, the server sends, to the client, a response packet indicating successful reception.

(6) If the client determines, according to the response packet, that the server successfully receives the packet carrying the MAC address of the virtual machine and the address of the host machine, the client adds the MAC address of the virtual machine to the local record of the client.

(7) The server maintains a record of a relationship between virtual machines and host machines corresponding to the virtual machines, searches the local record after receiving the MAC address of the virtual machine sent by the client, and determines whether the MAC address exists in the local record of the server. If the MAC address does not exist in the local record of the server, the server considers that the virtual machine is a newly enabled virtual machine, adds the MAC address of the virtual machine to the local record of the server, and determines that the virtual machine is not migrated; and if the MAC address exists in the local record of the server, the server performs step (8).

(8) The server searches the local record of the server for a host machine address corresponding to the MAC address of the virtual machine, compares the host machine address found in the local record of the server and corresponding to the MAC address of the virtual machine and the address of the host machine sent by the client, to determine whether the two addresses are the same; if the two addresses are the same, the server determines that the virtual machine corresponding to the MAC address is not migrated; and if the two addresses are different, the server determines that the virtual machine corresponding to the MAC address is migrated, the server performs step (9).

(9) After learning that the virtual machine is migrated, the server updates the local record of the server and notifies related security software of adjusting a security policy. The updating the local record of the server may be updating the host machine address that is corresponding to the MAC address of the virtual machine and has been stored in the local record of the server to be the address of the host machine carried in the packet sent by the client.

According to the method for determining virtual machine migration provided by this embodiment of the present invention, a client in a host machine obtains a MAC address of a virtual machine and an address of the host machine, and sends the MAC address of the virtual machine and the address of the host machine to a server, so that if the MAC address of the virtual machine exists in a local record of the server, the server can determine, by determining whether the address of the host machine carried in a packet sent by the client is the same as a host machine address corresponding to the MAC address of the virtual machine in the local record, whether the virtual machine is migrated. In this way, virtual machine migration is determined without using a specific communications protocol involved in the virtual machine migration, and a communications device that supports the specific communications protocol is not needed. Therefore, a requirement on a communications device is lowered to a great extent, thereby reducing a deployment cost.

A person of ordinary skill in the art may understand that all or a part of the steps of the methods in the embodiments may be implemented by a program instructing relevant hardware. The program may be stored in a computer readable storage medium. The storage medium may include a read-only memory, a magnetic disk, or an optical disc.

Figure 5A:
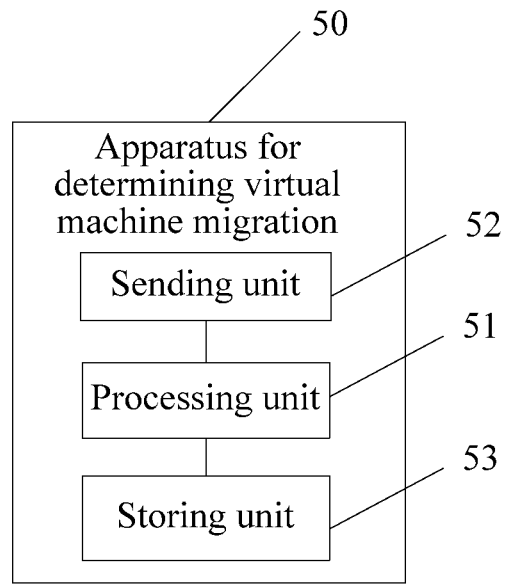
FIG. 5A is a structural block diagram of an apparatus for determining virtual machine migration according to an embodiment of the present invention.

FIG. 5A is a structural block diagram of an apparatus for determining virtual machine migration according to an embodiment of the present invention. Referring to FIG. 5A, the apparatus 50 for determining virtual machine migration provided by this embodiment of the present invention includes a processing unit 51, a sending unit 52, and a storing unit 53.

The processing unit 51 is configured to obtain a unique identifier of a virtual machine on a host machine in which the apparatus 50 is located and an address of the host machine.

The sending unit 52 is configured to, if the processing unit 51 determines that the unique identifier of the virtual machine does not exist in a local record of the apparatus, send a packet to a server in a network in which the host machine is located, where the packet carries the unique identifier of the virtual machine and the address of the host machine, so that the server determines, according to the unique identifier of the virtual machine and the address of the host machine, whether the virtual machine is migrated.

The storing unit 53 is configured to, if the processing unit 51 determines that the unique identifier of the virtual machine does not exist in the local record, add the unique identifier of the virtual machine to the local record to update the local record.

According to the apparatus for determining virtual machine migration provided by this embodiment of the present invention, the apparatus for determining virtual machine migration, which is in a host machine, obtains a unique identifier of a virtual machine and an address of the host machine, and sends the unique identifier of the virtual machine and the address of the host machine to a server, so that if the unique identifier of the virtual machine exists in a local record of the server, the server can determine, by determining whether the address of the host machine carried in a packet sent by the apparatus for determining virtual machine migration is the same as a host machine address corresponding to the unique identifier of the virtual machine in the local record, whether the virtual machine is migrated. In this way, virtual machine migration is determined without using a specific communications protocol involved in the virtual machine migration, and a communications device that supports the specific communications protocol is not needed. Therefore, a requirement on a communications device is lowered to a great extent, thereby reducing a deployment cost.

Optionally, in an embodiment of the present invention, the processing unit 51 is configured to intercept a packet from the virtual machine on the host machine, where the packet carries the unique identifier of the virtual machine; and obtain the unique identifier of the virtual machine from the intercepted packet; or, the processing unit 51 is configured to receive a packet from the virtual machine on the host machine and forwarded by a virtual switch on the host machine, where the packet carries the unique identifier of the virtual machine on the host machine; and obtain the unique identifier of the virtual machine on the host machine from the received packet.

Figure 5B:
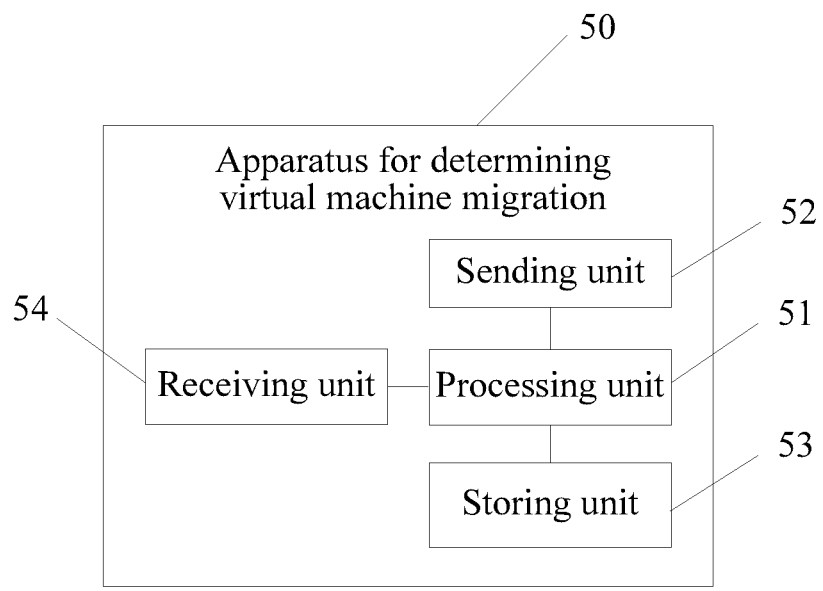
FIG. 5B is another structural block diagram of an apparatus for determining virtual machine migration according to an embodiment of the present invention.

Further, in another embodiment of the present invention, as shown in FIG. 5B, the apparatus 50 may further include a receiving unit 54, configured to, before the storing unit 53 adds the unique identifier of the virtual machine to the local record, receive a response packet that indicates successful reception and is sent by the server; in this case, the storing unit 53 is configured to, when the receiving unit receives the response packet that indicates successful reception and is sent by the server, add the unique identifier of the virtual machine to the local record.

It should be noted that, the apparatuses for determining virtual machine migration provided by FIG. 5A and FIG. 5B in the embodiments of the present invention may be disposed in a secure virtual machine in the host machine, the virtual switch in the host machine, or a component in the host machine and connected to a physical network adapter. The component connected to the physical network adapter may be not limited to a physical component, and may also be a component implemented in a software form. For a specific working procedure, refer to the description about the client in the method embodiment, which is not repeated herein.

Figure 6A:
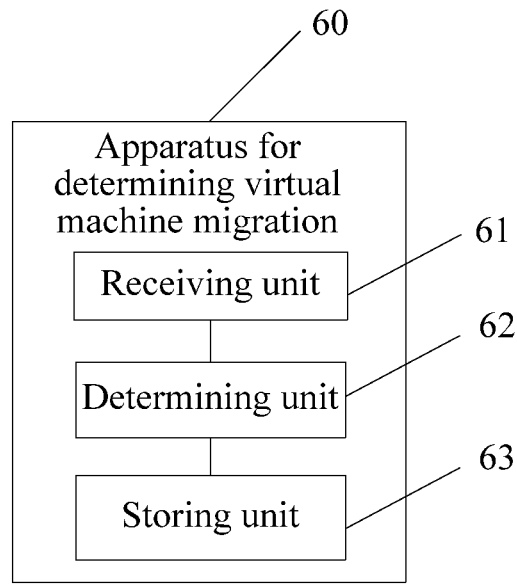
FIG. 6A is a structural block diagram of an apparatus for determining virtual machine migration according to an embodiment of the present invention.

FIG. 6A is a structural block diagram of an apparatus for determining virtual machine migration according to an embodiment of the present invention. Referring to FIG. 6A, the apparatus for determining virtual machine migration provided by this embodiment of the present invention includes a receiving unit 61, a determining unit 62, and a storing unit 63.

The receiving unit 61 is configured to receive a packet sent by a client in a host machine, where the packet carries a unique identifier of a virtual machine on the host machine and an address of the host machine.

The determining unit 62 is configured to determine whether the unique identifier of the virtual machine exists in a local record of the apparatus.

The storing unit 63 is configured to, if the determining unit 62 determines that the unique identifier of the virtual machine does not exist in the local record of the apparatus, add a correspondence between the unique identifier of the virtual machine and the address of the host machine to the local record of the apparatus.

The determining unit 62 is further configured to, if the unique identifier of the virtual machine exists in the local record of the apparatus, determine whether the address of the host machine carried in the packet is the same as a host machine address corresponding to the unique identifier of the virtual machine in the local record of the apparatus; if the address of the host machine carried in the packet is the same as the host machine address corresponding to the unique identifier of the virtual machine in the local record of the apparatus, determine that the virtual machine is not migrated; and if the address of the host machine carried in the packet is different from the host machine address corresponding to the unique identifier of the virtual machine in the local record of the apparatus, determine that the virtual machine is migrated.

Figure 6B:
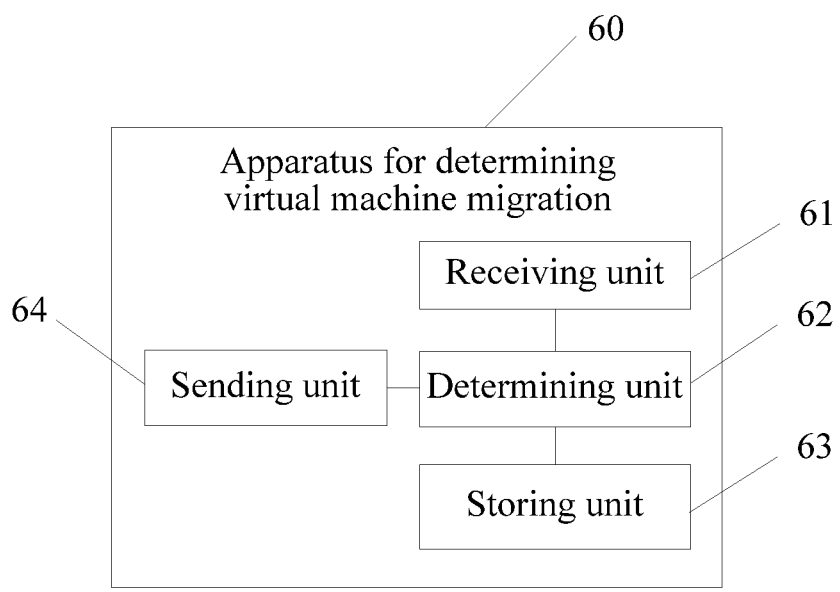
FIG. 6B is another structural block diagram of an apparatus for determining virtual machine migration according to an embodiment of the present invention.

Further, in an embodiment of the present invention, as shown in FIG. 6B, the apparatus may include a sending unit 64, configured to, after the receiving unit 61 receives the packet sent by the client, send, to the client, a response packet indicating successful reception, so that the client adds the unique identifier of the virtual machine to a local record of the client.

Figure 6C:
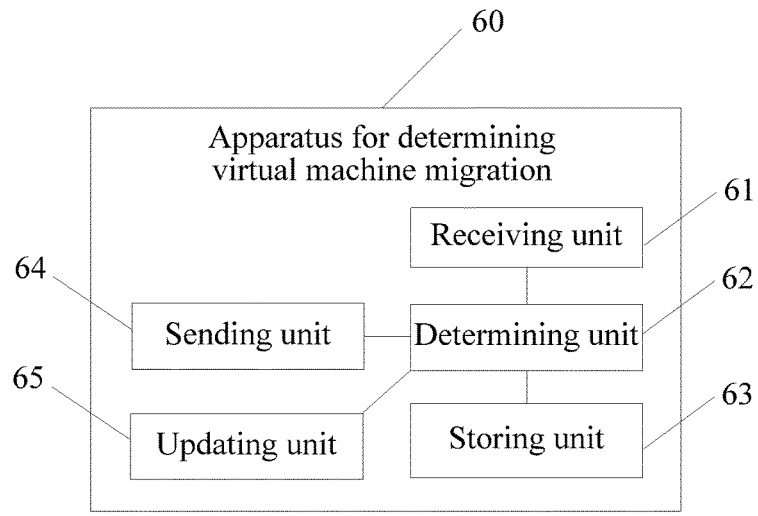
FIG. 6C is still another structural block diagram of an apparatus for determining virtual machine migration according to an embodiment of the present invention.

As shown in FIG. 6C, the apparatus further includes an updating unit 65, configured to, if the address of the host machine carried in the packet is different from the host machine address corresponding to the unique identifier of the virtual machine in the local record of the apparatus, update the host machine address that is corresponding to the unique identifier of the virtual machine and has been stored in the local record of the apparatus to be the address of the host machine carried in the packet.

According to the apparatus for determining virtual machine migration provided by this embodiment of the present invention, a client in a host machine obtains a unique identifier of a virtual machine and an address of the host machine, and sends the unique identifier of the virtual machine and the address of the host machine to the apparatus for determining virtual machine migration, so that if the unique identifier of the virtual machine exists in a local record of the apparatus, the apparatus for determining virtual machine migration can determine, by determining whether the address of the host machine carried in a packet sent by the client is the same as a host machine address corresponding to the unique identifier of the virtual machine in the local record, whether the virtual machine is migrated. In this way, virtual machine migration is determined without using a specific communications protocol involved in the virtual machine migration, and a communications device that supports the specific communications protocol is not needed. Therefore, a requirement on a communications device is lowered to a great extent, thereby reducing a deployment cost.

It should be noted that, in this embodiment of the apparatus for determining virtual machine migration, the unit division is merely logical function division, but the present invention is not limited to the foregoing division, as long as corresponding functions can be implemented. In addition, specific names of the functional units are merely provided for the purpose of distinguishing the units from one another, but are not intended to limit the protection scope of the present invention.

It should be noted that, working procedures of the apparatuses for determining virtual machine migration provided by FIG. 6A to FIG. 6C in the embodiments of the present invention correspond to the server in the method for determining virtual machine migration in this specification, and because the method for determining virtual machine migration has been described in detail in the foregoing, and related descriptions in the foregoing method embodiment are also applicable to the embodiments of the apparatuses, details are not described herein again.

Figure 7:
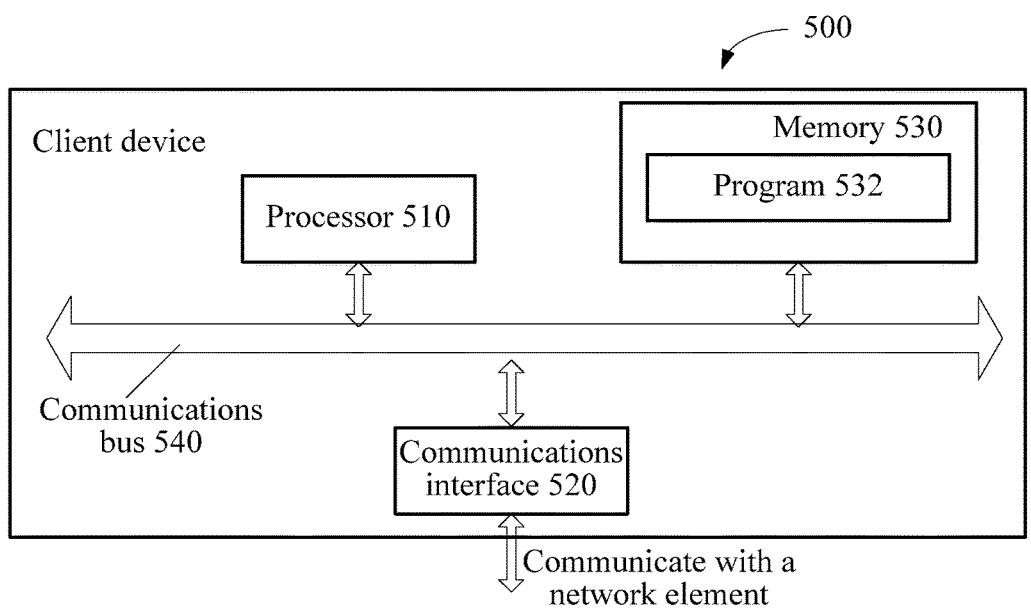
FIG. 7 is a schematic diagram of a client device for determining virtual machine migration according to an embodiment of the present invention.

FIG. 7 is a schematic diagram of a client device for determining virtual machine migration according to an embodiment of the present invention. Referring to FIG. 7, the client device 500 for determining virtual machine migration in this embodiment of the present invention may be any network device capable of implementing the functions in the foregoing method embodiment, for example, a router, a switch, or a network adapter. The client apparatus 500 for determining virtual machine migration may include a processor 510, a communications interface 520, a memory 530, and a bus 540.

The processor 510, the communications interface 520, and the memory 530 complete mutual communication using the bus 540.

The communications interface 520 is configured to communicate with an external network element.

The memory 530 is configured to store a program 532, and the memory 530 may carry a high-speed random access memory (RAM), and may also include a non-volatile memory, for example, at least one disk memory.

The program 532 may include program code, where the program code includes a computer operation instruction.

The processor 510 may be a central processing unit (CPU) or an application specific integrated circuit (ASIC), or is configured to be one or more integrated circuits in this embodiment of the present invention.

The processor 510 is configured to read the program 532, and perform the following operations: obtaining a unique identifier of a virtual machine on a host machine in which the client device is located and an address of the host machine; and if the unique identifier of the virtual machine does not exist in a local record of the client device, sending a packet to a server in a network in which the host machine is located, where the packet carries the unique identifier of the virtual machine and the address of the host machine, so that the server determines, according to the unique identifier of the virtual machine and the address of the host machine, whether the virtual machine is migrated; and adding the unique identifier of the virtual machine to the local record to update the local record.

The client device provided by this embodiment of the present invention obtains a unique identifier of a virtual machine and an address of the host machine, and sends the unique identifier of the virtual machine and the address of the host machine to a server, so that if the unique identifier of the virtual machine exists in a local record of the server, the server can determine, by determining whether the address of the host machine carried in a packet is the same as a host machine address corresponding to the unique identifier of the virtual machine in the local record, whether the virtual machine is migrated. In this way, virtual machine migration is determined without using a specific communications protocol involved in the virtual machine migration, and a communications device that supports the specific communications protocol is not needed. Therefore, a requirement on a communications device is lowered to a great extent, thereby reducing a deployment cost.

Optionally, in an embodiment of the present invention, the processor 510 is configured to perform the following operations: intercepting a packet from the virtual machine on the host machine, where the packet carries the unique identifier of the virtual machine on the host machine; and obtaining the unique identifier of the virtual machine on the host machine from the intercepted packet; or, the processor 510 is configured to perform the following operations: receiving a packet from the virtual machine on the host machine and forwarded by a virtual switch on the host machine, where the packet carries the unique identifier of the virtual machine on the host machine; and obtaining the unique identifier of the virtual machine on the host machine from the received packet.

The packet sent by the virtual machine may be an ARP packet.

In another embodiment of the present invention, further, the processor 510 is further configured to perform the following operations: receiving a response packet that indicates successful reception and is sent by the server; and when the response packet that indicates successful reception and is sent by the server is received, adding the unique identifier of the virtual machine to the local record of the client device.

It should be noted that, the client device provided by this embodiment of the present invention may be disposed in a secure virtual machine in the host machine, the virtual switch in the host machine, or a component in the host machine and connected to a physical network adapter. The component connected to the physical network adapter may be not limited to a physical component, and may also be a component implemented in a software form.

Figure 8:
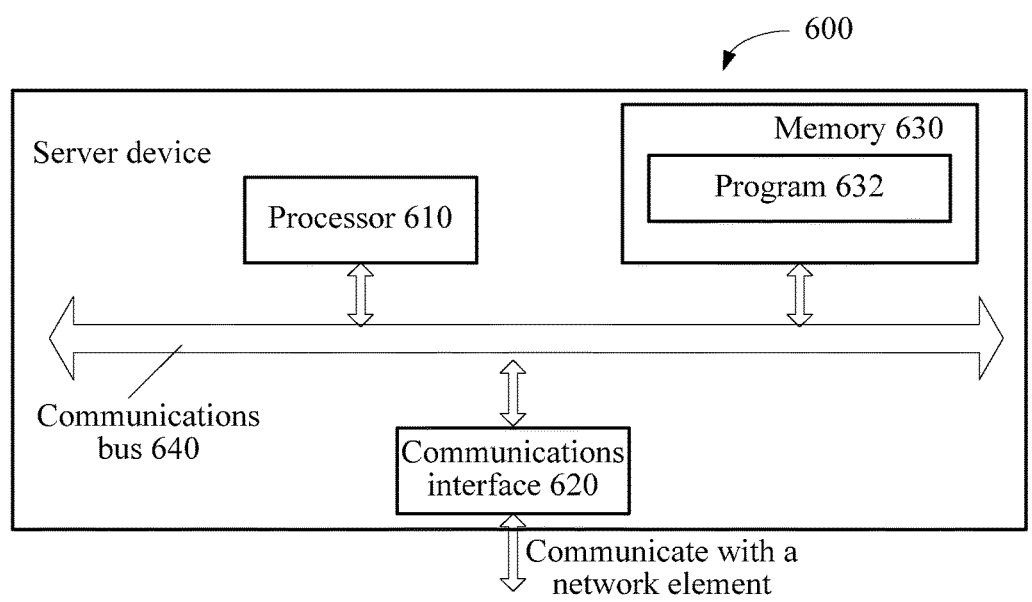
FIG. 8 is a schematic diagram of a server device for determining virtual machine migration according to an embodiment of the present invention.

FIG. 8 is schematic diagram of a server device according to an embodiment of the present invention. Referring to FIG. 8, the server device 600 in this embodiment of the present invention may be any network device capable of implementing corresponding functions, for example, a router, a switch, or a network adapter. The server device 600 includes a processor 610, a communications interface 620, a memory 630, and a bus 640.

The processor 610, the communications interface 620, and the memory 630 complete mutual communication using the bus 640.

The communications interface 620 is configured to communicate with an external network element.

The memory 630 is configured to store a program 632, the memory 630 may carry a high-speed RAM memory, and may also include a non-volatile memory (non-volatile memory), for example, at least one disk memory.

The program 632 may include program code, where the program code includes a computer operation instruction.

The processor 610 may be a CPU or an ASIC, or is configured to be one or more integrated circuits in this embodiment of the present invention.

The processor 610 is configured to read the program in the memory 630, and perform the following operations: receiving a packet sent by a client in a host machine, where the packet carries a unique identifier of a virtual machine and an address of the host machine in which the client is located; if the unique identifier of the virtual machine does not exist in a local record of the server device, adding a correspondence between the unique identifier of the virtual machine and the address of the host machine to the local record of the server device; and if the unique identifier of the virtual machine exists in the local record of the server device, determining whether the address of the host machine carried in the packet is the same as a host machine address corresponding to the unique identifier of the virtual machine in the local record of the server device; if the address of the host machine carried in the packet is the same as the host machine address corresponding to the unique identifier of the virtual machine in the local record of the server device, determining that the virtual machine is not migrated; and if the address of the host machine carried in the packet is different from the host machine address corresponding to the unique identifier of the virtual machine in the local record of the server device, determining that the virtual machine is migrated.

In an embodiment of the present invention, the processor 610 is further configured to perform the following operations: after the packet sent by the client is received, sending, to the client, a response packet indicating successful reception, so that the client adds the unique identifier of the virtual machine to the local record of the server device.

In an embodiment of the present invention, the processor 610 is further configured to perform the following operations: if the address of the host machine carried in the packet is different from the host machine address corresponding to the unique identifier of the virtual machine in the local record of the server device, updating the host machine address that is corresponding to the unique identifier of the virtual machine and has been stored in the local record of the server device to be the address of the host machine carried in the packet.

The server device provided by this embodiment of the present invention receives a packet that carries a unique identifier of a virtual machine and an address of a host machine and is sent by a client in a network in which the server device is located, so that if the unique identifier of the virtual machine exists in a local record of the server device, the server device can determine, by determining whether the address of the host machine carried in the packet is the same as a host machine address corresponding to the unique identifier of the virtual machine in the local record, whether the virtual machine is migrated. In this way, virtual machine migration is determined without using a specific communications protocol involved in the virtual machine migration, and a communications device that supports the specific communications protocol is not needed. Therefore, a requirement on a communications device is lowered to a great extent, thereby reducing a deployment cost.

It should be noted that, the client device and the server device that are provided by the embodiments of the present invention correspond to the method for determining virtual machine migration in this specification, and because the method for determining virtual machine migration has been described in detail in the foregoing, and related descriptions in the method embodiment are also applicable to the embodiments of the client device and the server device, details are not described herein again.

In addition, it should be noted that, the client device and the server device that are provided by the embodiments of the present invention may be not limited to a physical client device and a physical server device, and may also be a client device and a server device that are implemented by software and based on hardware.

Figure 2B:
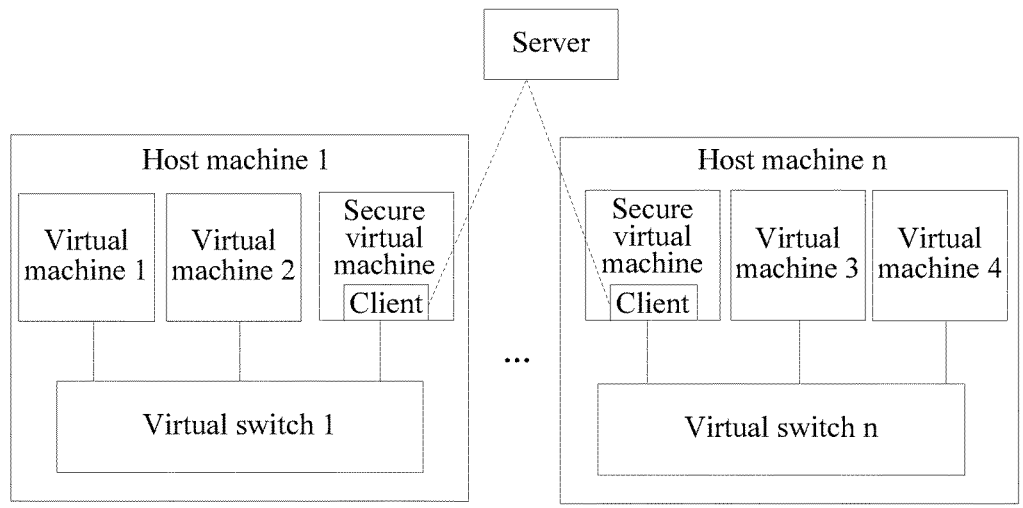
FIG. 2B is a schematic diagram of a deployment structure of a system according to an embodiment of the present invention.
Figure 2C:
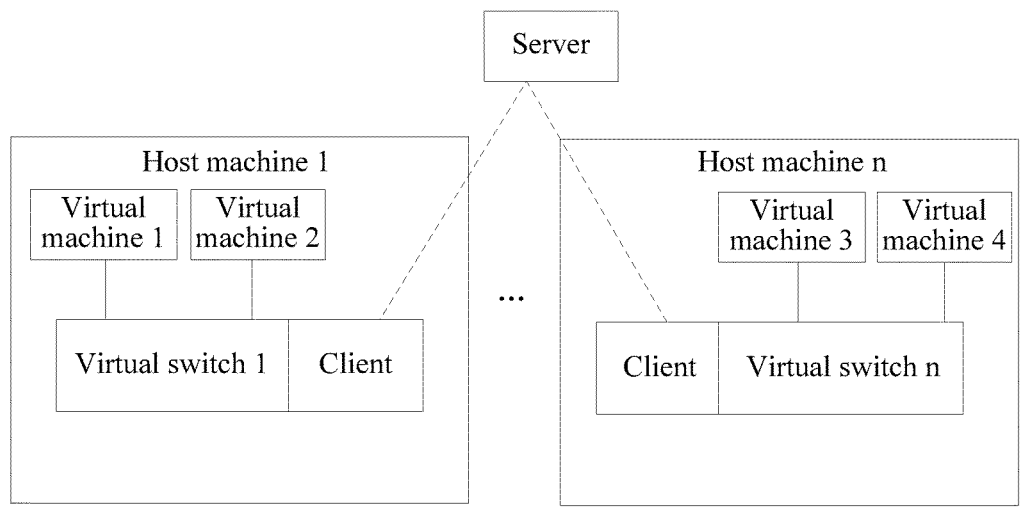
FIG. 2C is another schematic diagram of a deployment structure of a system according to an embodiment of the present invention.
Figure 2D:
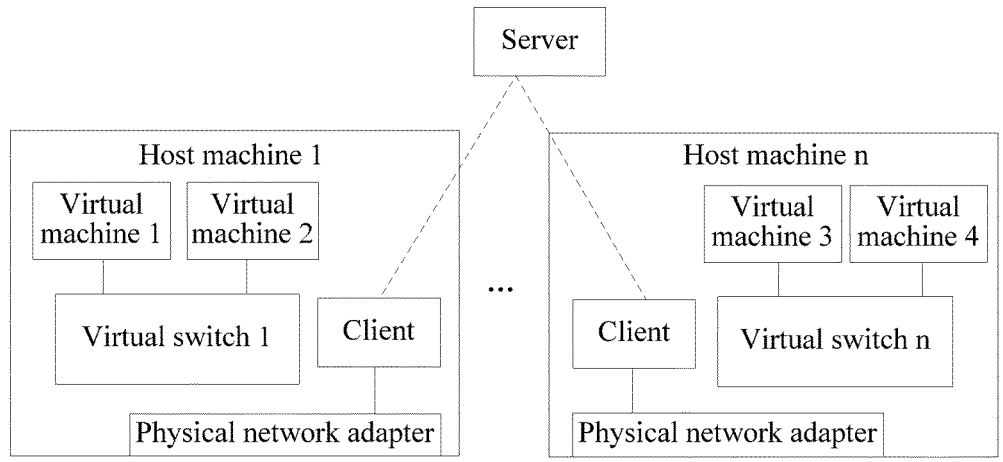
FIG. 2D is still another schematic diagram of a deployment structure of a system according to an embodiment of the present invention.

An embodiment of the present invention further provides a system for determining virtual machine migration, where the system includes at least one client device shown in FIG. 7 and at least one server device shown in FIG. 8, and for a specific deployment manner, refer to FIG. 2B to FIG. 2D in the foregoing.

The client device in the system is configured to obtain a unique identifier of a virtual machine on a host machine in which the client device is located and an address of the host machine; if the unique identifier of the virtual machine does not exist in a local record of the client device, send a packet to the server device in a network in which the host machine is located, where the packet carries the unique identifier of the virtual machine and the address of the host machine, so that the server device determines, according to the unique identifier of the virtual machine and the address of the host machine, whether the virtual machine is migrated; and add the unique identifier of the virtual machine to the local record to update the local record of the client device.

The server device is configured to receive the packet sent by the client device in the network, where the packet carries the unique identifier of the virtual machine and the address of the host machine in which the client device is located; if the unique identifier of the virtual machine does not exist in a local record of the server device, the server device adds a correspondence between the unique identifier of the virtual machine and the address of the host machine to the local record of the server device; and if the unique identifier of the virtual machine exists in the local record of the server device, the server device determines whether the address of the host machine carried in the packet is the same as a host machine address corresponding to the unique identifier of the virtual machine in the local record of the server device; if the address of the host machine carried in the packet is the same as the host machine address corresponding to the unique identifier of the virtual machine in the local record of the server device, the server device determines that the virtual machine is not migrated; and if the address of the host machine carried in the packet is different from the host machine address corresponding to the unique identifier of the virtual machine in the local record of the server device, the server device determines that the virtual machine is migrated.

A person of ordinary skill in the art may understand that, each aspect or a possible implementation manner of each aspect of the present invention may be implemented as a system, a method, or a computer program product. Therefore, each aspect or a possible implementation manner of each aspect of the present invention may use a form of a complete hardware embodiment, a complete software embodiment (including firmware, resident software, and the like), or an embodiment combining software and hardware aspects, which are collectively referred to as a "circuit", a "module", or a "system" herein. In addition, each aspect or a possible implementation manner of each aspect of the present invention may use a form of a computer program product, where the computer program product refers to computer readable program code stored in a computer readable medium.

The computer readable medium may be a computer readable signal medium or a computer readable storage medium. The computer readable storage medium includes but is not limited to electronic, magnetic, optical, electromagnetic, infrared, or semi-conductor systems, devices, or apparatuses, or any appropriate combination thereof, for example, a RAM, a read-only memory (ROM), an erasable programmable read-only memory (EPROM or a flash memory), an optical fiber, or a Compact Disc Read-Only Memory (CD-ROM).

A processor in a computer reads computer readable program code stored in a computer readable medium, so that the processor can perform a functional action defined in each step in the flowcharts or a combination of steps, and an apparatus that performs a functional action defined in each block or a combination of blocks in the block diagrams is generated.

The computer readable program code can be completely performed on a computer of a user, partially performed on a computer of a user, used as a separate software package, partially performed on a computer of a user and partially performed on a remote computer, or completely performed on a remote computer or a server. It should also be noted that, in some alternative implementation solutions, steps in the flowcharts or functions indicated in blocks in the block diagrams may not occur according to a sequence indicated in the figures. For example, dependent on involved functions, two steps or two blocks that are successively shown may be performed approximately at the same time, or these blocks may be performed in a reverse sequence sometimes.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for determining virtual machine migration comprising:
   obtaining, by a client in a host machine, a unique identifier of a virtual machine on the host machine and an address of the host machine; and
   sending, by the client, a packet to a server in a network in which the host machine is located when the unique identifier of the virtual machine does not exist in a local record of the client, wherein the packet carries the unique identifier of the virtual machine and the address of the host machine, so that the server determines, according to the unique identifier of the virtual machine and the address of the host machine, whether the virtual machine is migrated; and
   adding, by the client, the unique identifier of the virtual machine to the local record to update the local record.

2. The method according to claim 1, wherein obtaining, by the client in a host machine, the unique identifier of the virtual machine on the host machine comprises:
   intercepting, by the client in the host machine, a packet from the virtual machine on the host machine, wherein the packet carries the unique identifier of the virtual machine; and
   obtaining the unique identifier of the virtual machine from the intercepted packet.

3. The method according to claim 2, wherein the packet from the virtual machine on the host machine is an Address Resolution Protocol (ARP) packet.

4. The method according to claim 1, wherein obtaining, by the client in a host machine, the unique identifier of the virtual machine on the host machine comprises:
   receiving, by the client in the host machine, a packet from the virtual machine on the host machine and forwarded by a virtual switch on the host machine, wherein the packet carries the unique identifier of the virtual machine on the host machine; and
   obtaining the unique identifier of the virtual machine from the received packet.

5. The method according to claim 1, wherein before adding, by the client, the unique identifier of the virtual machine to the local record, the method further comprises:
   receiving, by the client, a response packet that indicates successful reception and is sent by the server; and
   adding, by the client, the unique identifier of the virtual machine to the local record when the response packet that indicates successful reception and is sent by the server is received.

6. The method according to claim 1, wherein the unique identifier is a media access control (MAC) address of the virtual machine, or a statically configured internet protocol (IP) address of the virtual machine.

7. The method according to claim 1, wherein the client is disposed in a secure virtual machine in the host machine, the virtual switch in the host machine, or a component in the host machine and connected to a physical network adapter.

8. A method for determining virtual machine migration comprising:
   receiving, by a server, a packet sent by a client in a host machine, wherein the packet carries a unique identifier of a virtual machine on the host machine and an address of the host machine;
   adding, by the server, a correspondence between the unique identifier of the virtual machine and the address of the host machine to the local record of the server when the unique identifier of the virtual machine does not exist in a local record of the server;
   determining, by the server, whether the address of the host machine carried in the packet is the same as a host machine address corresponding to the unique identifier of the virtual machine in the local record of the server when the unique identifier of the virtual machine exists in the local record of the server;
   determining that the virtual machine is not migrated when the address of the host machine carried in the packet is the same as the host machine address corresponding to the unique identifier of the virtual machine in the local record of the server; and
   determining that the virtual machine is migrated when the address of the host machine carried in the packet is different from the host machine address corresponding to the unique identifier of the virtual machine in the local record of the server.

9. The method according to claim 8, wherein after receiving the packet sent by the client, the method further comprises sending, to the client, a response packet indicating successful reception, so that the client adds the unique identifier of the virtual machine to a local record of the client.

10. The method according to claim 9, wherein, when the address of the host machine carried in the packet is different from the host machine address corresponding to the unique identifier of the virtual machine in the local record of the server, the method further comprises updating the host machine address that is corresponding to the unique identifier of the virtual machine and has been stored in the local record of the server to be the address of the host machine carried in the packet.

11. The method according to claim 8, wherein, when the address of the host machine carried in the packet is different from the host machine address corresponding to the unique identifier of the virtual machine in the local record of the server, the method further comprises updating the host machine address that is corresponding to the unique identifier of the virtual machine and has been stored in the local record of the server to be the address of the host machine carried in the packet.

12. A client device comprising:
   a processor;
   a communications interface;
   a memory; and
   a bus, wherein the processor, the communications interface, and the memory complete mutual communication using the bus, wherein the communications interface is configured to communicate with an external network element, wherein the memory is configured to store a program, and wherein the processor is configured to:
   read the program in the memory;
   obtain a unique identifier of a virtual machine on a host machine in which the client device is located and an address of the host machine;
   send a packet to a server in a network in which the host machine is located when the unique identifier of the virtual machine does not exist in a local record of the client device, wherein the packet carries the unique identifier of the virtual machine and the address of the host machine, so that the server determines, according to the unique identifier of the virtual machine and the address of the host machine, whether the virtual machine is migrated; and
   add the unique identifier of the virtual machine to the local record to update the local record.

13. The device according to claim 12, wherein the processor is configured to:

intercept a packet from the virtual machine on the host machine, wherein the packet carries the unique identifier of the virtual machine on the host machine; and obtain the unique identifier of the virtual machine on the host machine from the intercepted packet; or wherein the processor is configured to perform the following operations:

receive a packet from the virtual machine on the host machine and forwarded by a virtual switch on the host machine, wherein the packet carries the unique identifier of the virtual machine on the host machine; and obtain the unique identifier of the virtual machine on the host machine from the received packet.

14. The device according to claim 13, wherein the device is disposed in a secure virtual machine in the host machine, the virtual switch in the host machine, or a component in the host machine and connected to a physical network adapter.

15. The device according to claim 12, wherein the processor is further configured to:

receive a response packet that indicates successful reception and is sent by the server; and add the unique identifier of the virtual machine to the local record when the response packet that indicates successful reception and is sent by the server is received.

16. The device according to claim 12, wherein the device is disposed in a secure virtual machine in the host machine, the virtual switch in the host machine, or a component in the host machine and connected to a physical network adapter.

17. A server device comprising:

a processor;

a communications interface;

a memory; and a bus, wherein the processor, the communications interface, and the memory complete mutual communication using the bus, wherein the communications interface is configured to communicate with an external network element, wherein the memory is configured to store a program, wherein the processor is configured to perform the program, and wherein the processor is configured to:

read the program in the memory;

receive a packet sent by a client in a host machine, wherein the packet carries a unique identifier of a virtual machine and an address of the host machine;

add a correspondence between the unique identifier of the virtual machine and the address of the host machine to the local record of the server device when the unique identifier of the virtual machine does not exist in a local record of the server device;

determine whether the address of the host machine carried in the packet is the same as a host machine address corresponding to the unique identifier of the virtual machine in the local record of the server device when the unique identifier of the virtual machine exists in the local record of the server device;

determine that the virtual machine is not migrated when the address of the host machine carried in the packet is the same as the host machine address corresponding to the unique identifier of the virtual machine in the local record of the server device; and determine that the virtual machine is migrated when the address of the host machine carried in the packet is different from the host machine address corresponding to the unique identifier of the virtual machine in the local record of the server device.

18. The device according to claim 17, wherein the processor is further configured to send, to the client, a response packet indicating successful reception after the packet sent by the client is received, so that the client adds the unique identifier of the virtual machine to a local record of the client.

19. The device according to claim 18, wherein the processor is further configured to update the host machine address that is corresponding to the unique identifier of the virtual machine and has been stored in the local record of the server device to be the address of the host machine carried in the packet when the address of the host machine carried in the packet is different from the host machine address corresponding to the unique identifier of the virtual machine in the local record of the server device.

20. The device according to claim 17, wherein the processor is further configured to update the host machine address that is corresponding to the unique identifier of the virtual machine and has been stored in the local record of the server device to be the address of the host machine carried in the packet when the address of the host machine carried in the packet is different from the host machine address corresponding to the unique identifier of the virtual machine in the local record of the server device.

* * * * *